(12) United States Patent
MacDougall

(10) Patent No.: US 6,766,793 B2
(45) Date of Patent: Jul. 27, 2004

(54) ELECTROMAGNETIC GUN AND ROTATING PULSE FORMING NETWORK

(75) Inventor: Frederick W. MacDougall, San Diego, CA (US)

(73) Assignee: General Atomics, San Diego, CA (US)

( * ) Notice: Subject to any disclaimer, the term of this patent is extended or adjusted under 35 U.S.C. 154(b) by 0 days.

(21) Appl. No.: 10/319,450

(22) Filed: Dec. 12, 2002

(65) Prior Publication Data

US 2004/0112205 A1 Jun. 17, 2004

(51) Int. Cl.[7] .................................................. F41B 6/00
(52) U.S. Cl. ................................................. 124/3; 89/8
(58) Field of Search ..................................... 89/8; 124/3

(56) References Cited

U.S. PATENT DOCUMENTS

| | | | | |
|---|---|---|---|---|
| 3,431,816 A | * | 3/1969 | Dale | 89/8 |
| 3,503,300 A | * | 3/1970 | Dardick | 89/8 |
| 3,832,569 A | | 8/1974 | Anderson et al. | 307/110 |
| 4,608,908 A | * | 9/1986 | Carlson et al. | 89/8 |
| 4,753,153 A | * | 6/1988 | Jasper, Jr. | 89/8 |
| 4,840,107 A | * | 6/1989 | Weldon | 89/8 |
| 5,233,902 A | * | 8/1993 | Bernardes | 89/8 |
| 5,261,315 A | * | 11/1993 | Marinos | 102/202.7 |
| 5,355,764 A | * | 10/1994 | Marinos et al. | 89/8 |
| 5,417,140 A | * | 5/1995 | Onozuka et al. | 89/8 |
| 5,763,812 A | | 6/1998 | Collins | 89/8 |
| 5,800,857 A | | 9/1998 | Ahmad et al. | 427/80 |
| 5,867,363 A | | 2/1999 | Tsai et al. | 361/502 |
| 5,909,001 A | * | 6/1999 | Goldstein | 89/8 |
| 6,060,791 A | | 5/2000 | Goerz et al. | 307/110 |
| 6,166,459 A | | 12/2000 | Holland et al. | 307/109 |
| 6,215,278 B1 | | 4/2001 | Okamura et al. | 320/119 |

* cited by examiner

*Primary Examiner*—Charles T. Jordan
*Assistant Examiner*—John W. Zerr
(74) *Attorney, Agent, or Firm*—Fitch, Even, Tabin & Flannery

(57) ABSTRACT

An electromagnetic gun and rotating pulsed network system that includes a gun barrel coupled to a gun mount coupled on a rotating deck of a naval ship. A pulse forming network provides pulsed energy to the electromagnetic gun, and the pulse forming network is cylindrical in shape so as to be rotatable within a cylindrical bulkhead within the ship. The pulse forming network may rotate in unison with the gun barrel allowing cables to couple the pulse forming network and the cable barrel. The pulse forming network includes wedge shaped capacitors that, when positioned sided by side, collectively form a substantially circular shape.

20 Claims, 10 Drawing Sheets

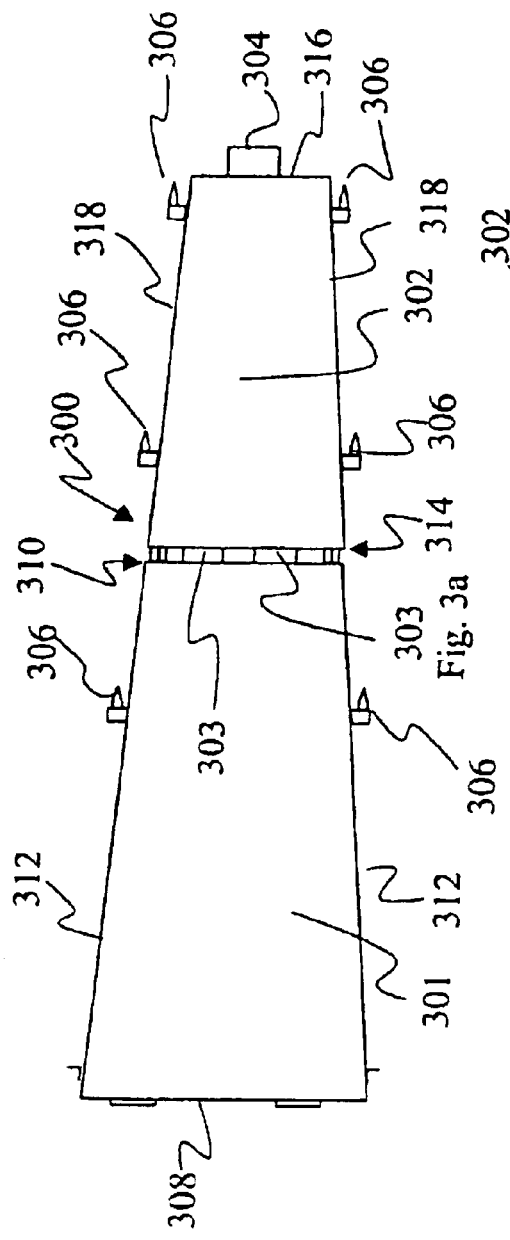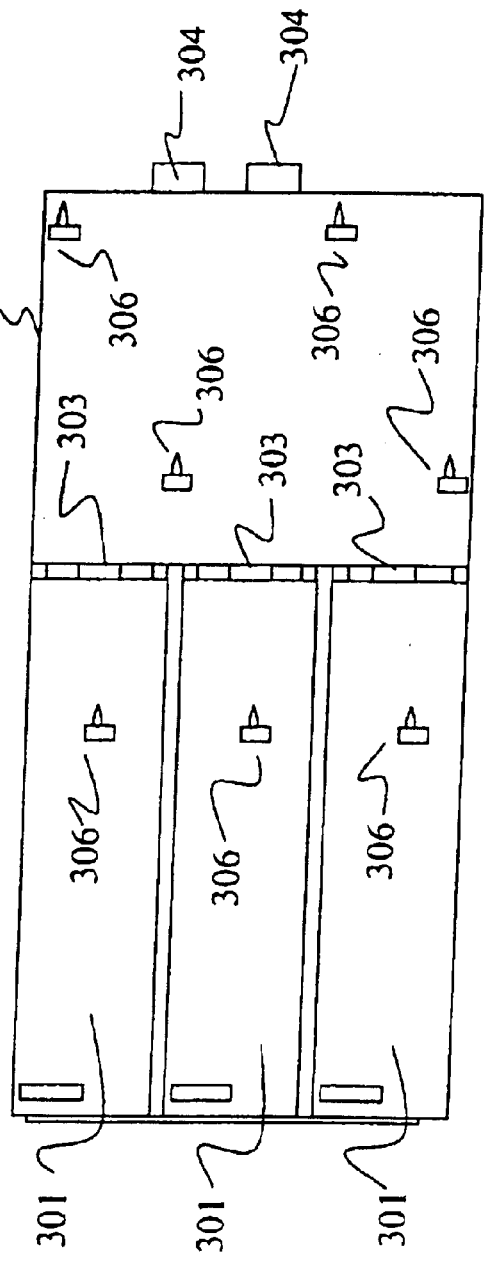
Fig. 3a
Fig. 3b

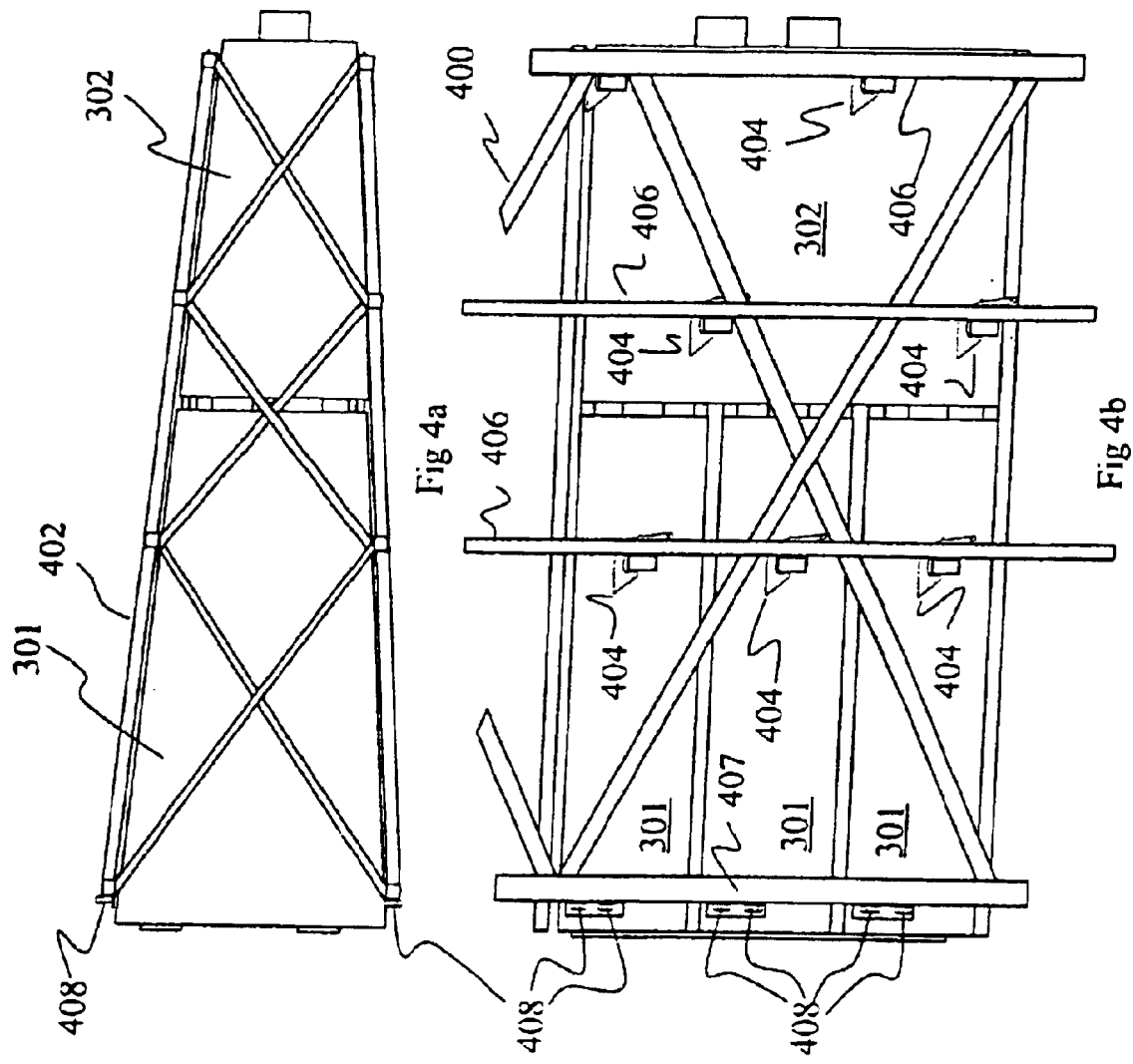

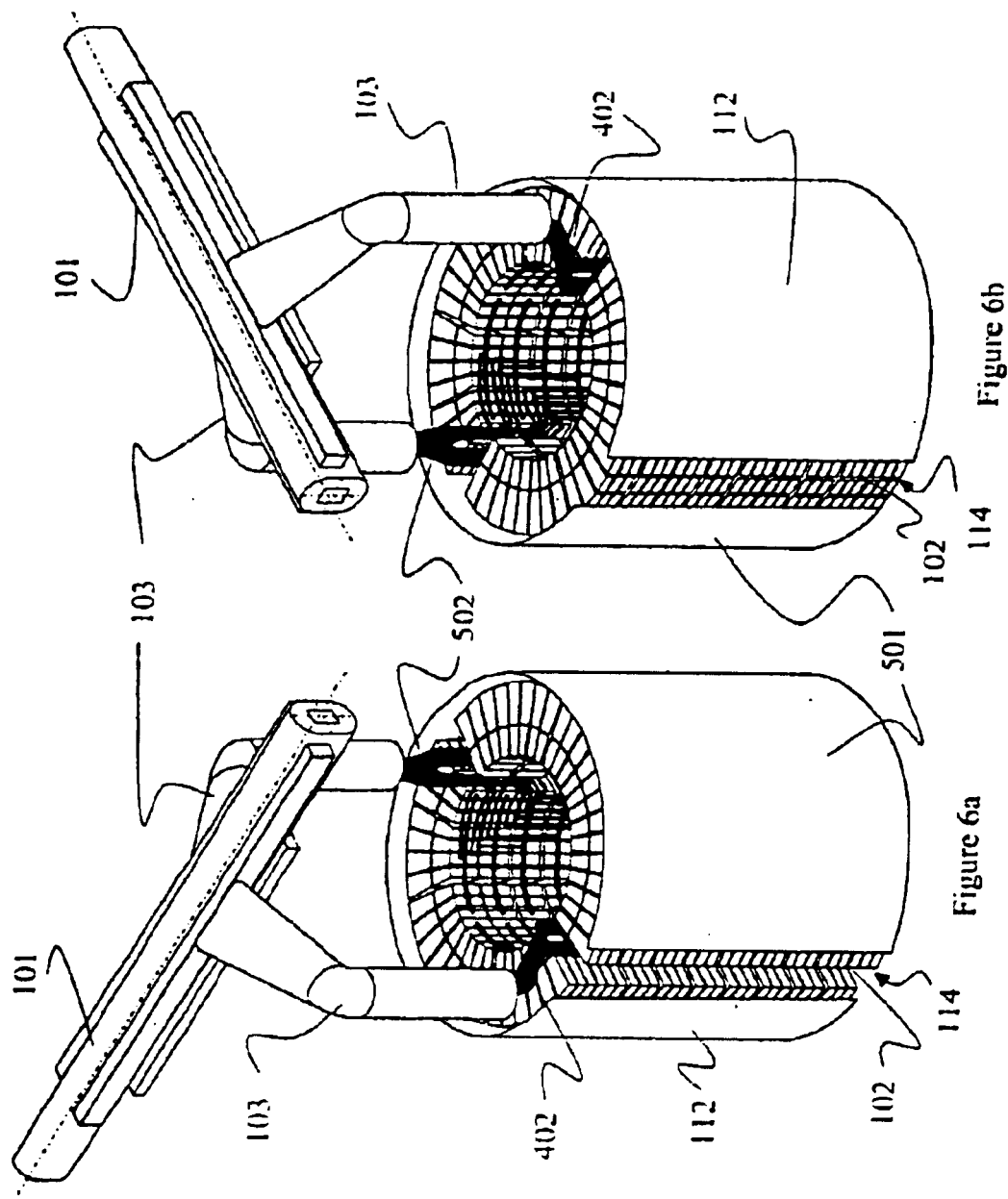

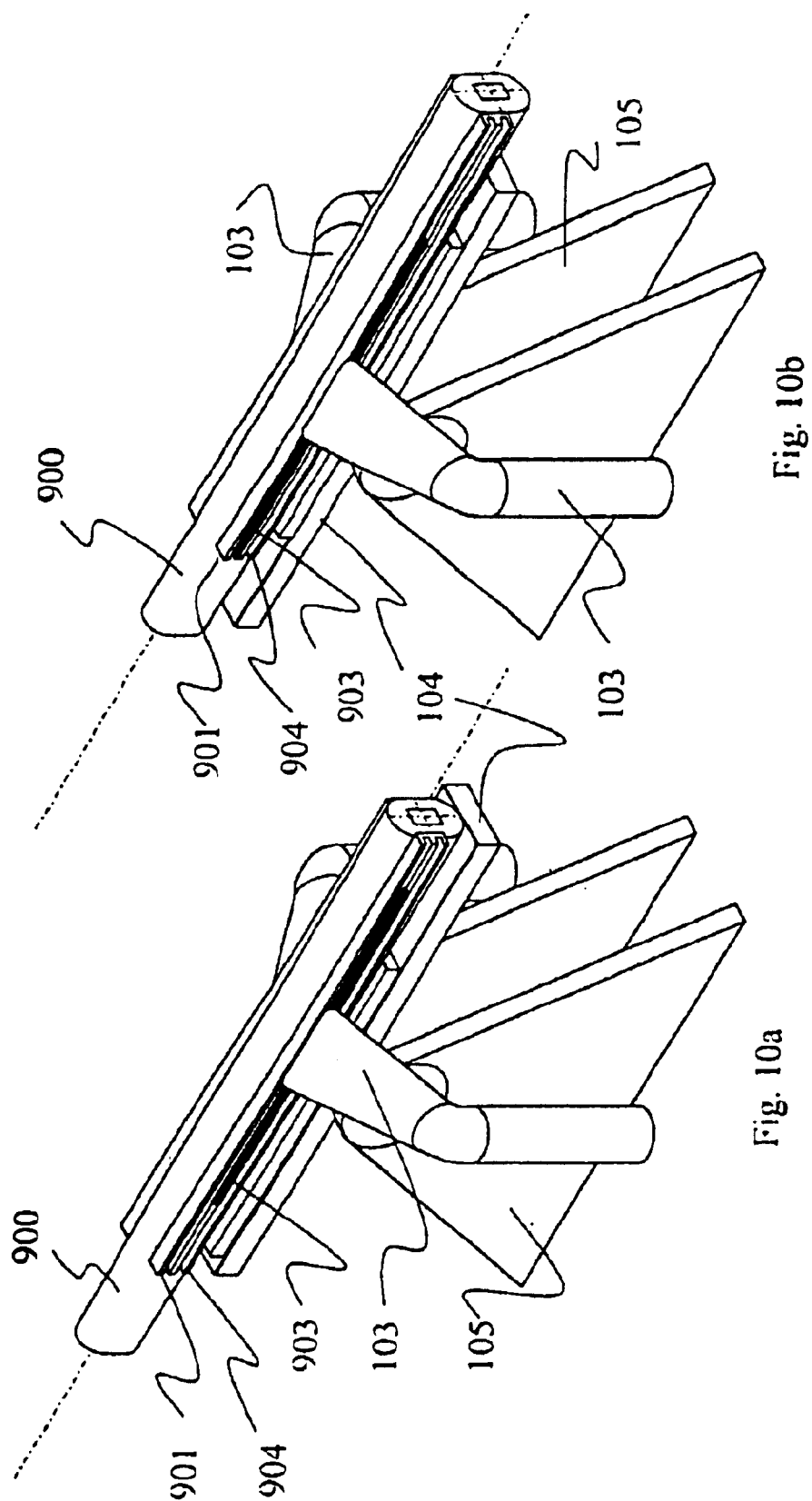

ELECTROMAGNETIC GUN AND ROTATING PULSE FORMING NETWORK

BACKGROUND OF THE INVENTION

1. Field of the Invention

The present invention relates generally to electromagnetic guns, and more specifically to electromagnetic gun and pulse forming network systems.

2. Discussion of the Related Art

Electromagnetic (EM) guns operate by storing a large amount of energy in one or more storage units over several seconds or minutes. This energy is then released over a period of hundreds of microseconds to milliseconds to the gun through a pulse forming network (PFN). The PFN controls an energy pulse or pulses so that the maximum energy is imparted to the projectile.

There are several types of EM guns. A rail gun is one of these. It is operated by placing a projectile between two electrically charged rails and creating an arc behind the projectile. The electromagnetic force created when the current flows up to the projectile, across to the adjacent rail and back down the adjacent rail causes the arc to move up the barrel and push the projectile ahead of it.

A second EM gun is a coil gun. With a coil gun, a series of coils surround the barrel, and the coils are energized in sequence starting from the back of the gun. As each coil is energized, the projectile is pulled into the coil like a solenoid.

A third type of gun which might use this invention is the Electrothermo Chemical (ETC) gun. While an ETC gun is not generally considered an EM gun, it does require a substantial discharge of energy to bring the chemical propellant up to temperature. Typically most of the energy for this type of gun is obtained from the chemical propellant and the amount of energy required from the PFN is significantly less than an EM gun.

There are a number of different methods of storing energy for an EM or ETC gun. Most of today's large EM gun experiments are driven by electrostatic capacitor bank based energy storage devices. The capacitors are charged over a few seconds and then discharged through a PFN. Capacitor banks are normally modular in nature where several elements are connected in parallel or in series and parallel.

Rotating machinery such as a compulsator (compensated pulsed alternators) or homopolar generators is another method used to store energy for an EM or ETC gun. With this system, a rotating mass is spun at a very high speed and kinetic energy is stored in the speed of the rotating mass. To get the energy out of the rotating mass, it is slowed down using an electrical breaking method that results in a large current pulse emanating from the device. This current pulse is then shaped using a PFN and delivered to the gun barrel.

Electrolytic capacitors, as opposed to electrostatic capacitors can also be used to drive electric guns. The electrolytic capacitor generally has a longer time constant and sometimes has difficulty in responding fast enough to drive fast rail guns.

Two other devices that can be used for electric gun energy storage are batteries and chemical-double-layer capacitors. Like the electrolytic capacitor, both of these devices have a high energy density and relatively high internal impedance. The high internal impedance results in a relatively slow response time and high internal losses. For this reason, these devices are normally not used for large EM or ETC guns.

Modern EM Naval guns are being designed with ranges of 350 miles. To achieve this range, a 20 kg projectile requires a muzzle velocity of 2.5 kilometers per second km/s or a muzzle energy of 63 Mega Joules (MJ). To accomplish this, approximately 150 MJ needs to be delivered to the gun. The stored energy for such a system is approximately 200 MJ. Thus, regardless of the energy storage means, a substantial volume is required to store the energy that needs to be delivered to the gun.

SUMMARY OF THE INVENTION

In one aspect, the invention can be characterized as an electromagnetic gun system comprising a gun barrel coupled to a gun mount. The gun mount is coupled to a rotating deck and a pulse forming network is electrically coupled to the gun barrel. The pulse forming network is configured to rotate about an axis.

In another aspect, the invention can be characterized as a method for using an electromagnetic gun in a shipboard environment including the steps of obtaining an electromagnetic gun; obtaining a pulse forming network that comprises a substantially circular shape; coupling the electromagnetic gun to a rotatable deck on a surface of a ship; placing the pulse forming network in a substantially circular-shaped bulkhead located below the rotatable deck; providing energy from the ship to the pulse forming network; and providing pulsed energy from the pulse forming network to the electromagnetic gun.

In yet another aspect, the invention can be characterized as a capacitor module for a pulse forming network. The capacitor module comprises a capacitor disposed in a radial direction, and the capacitor includes an outer edge, an inner edge and side portions. The side portions couple the outer edge to the inner edge, and the outer edge and inner edge are substantially normal to the radial direction. The outer edge is thicker than the inner edge and the capacitor tapers from the outer edge to the inner edge such that a distance between the side portions is greater at the outer edge than at the inner edge.

BRIEF DESCRIPTION OF THE DRAWINGS

The above and other aspects, features and advantages of the present invention will be more apparent from the following more particular description thereof, presented in conjunction with the following drawings wherein:

FIGS. 3a and 3b are plan and side views, respectively, of one embodiment of a capacitor module of the PFN shown in FIG. 1;

FIGS. 4a and 4b are plan and side views, respectively, of a space frame for supporting the capacitor modules shown in FIG. 3;

FIGS. 6a and 6b are perspective views of the PFN and bulkhead shown in FIG. 1 that illustrate a rotating aspect of the PFN;

FIGS. 10*a* and 10*b* are perspective views of the gun barrel of FIG. 9 in a ready and a recoil position respectively.

Corresponding reference characters indicate corresponding components throughout the several views of the drawings.

DETAILED DESCRIPTION

The following description is not to be taken in a limiting sense, but is made merely for the purpose of describing the general principles of the invention. The scope of the invention should be determined with reference to the claims.

Figure 1:
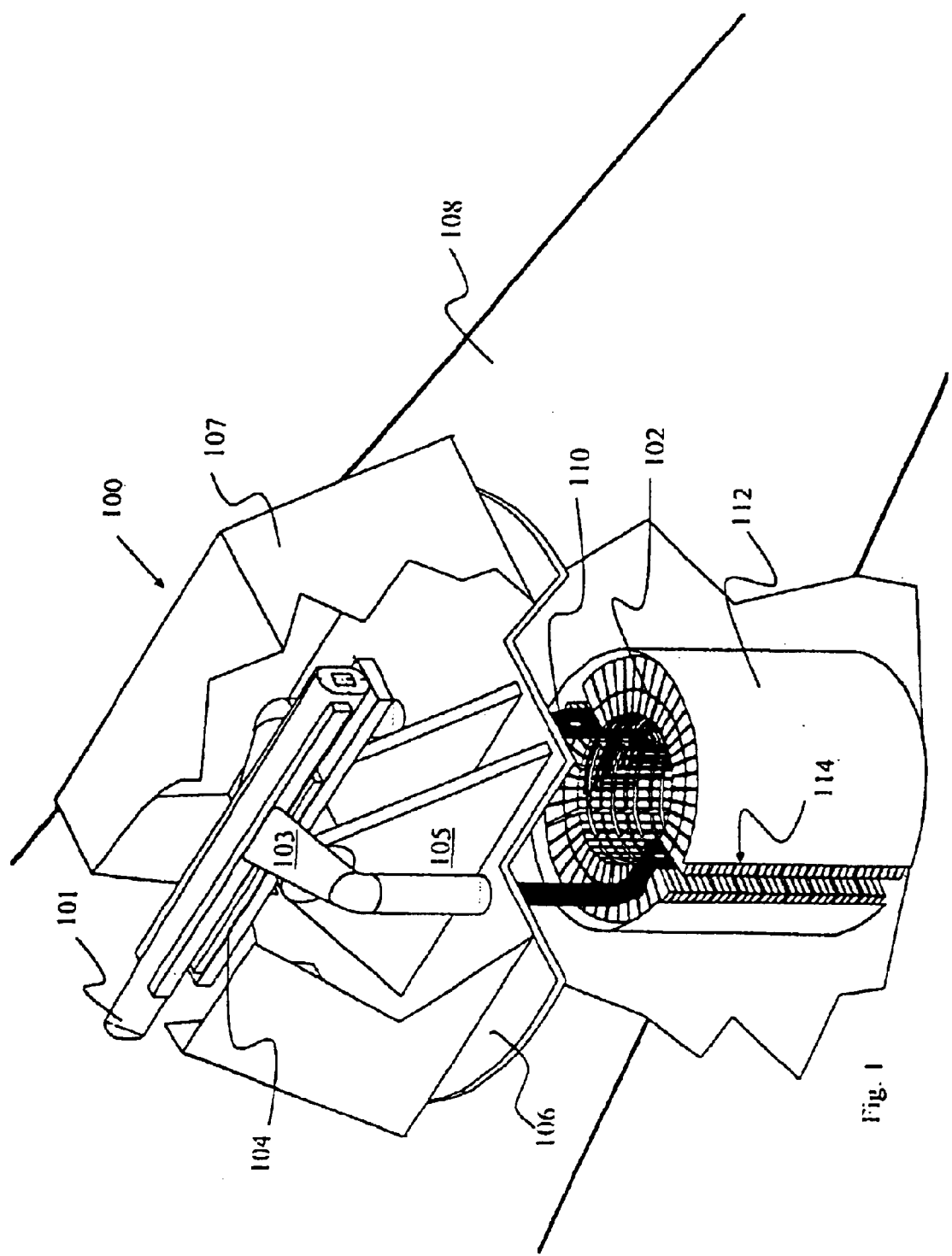
FIG. 1 is a perspective view of an electromagnetic gun and pulse forming network (PFN) in a shipboard environment in accordance with one embodiment of the present invention.

Referring to FIG. 1, shown is an electromagnetic (EM gun and a pulse forming network (PFN) in a shipboard environment in accordance with one embodiment of the present invention. Shown is a turret 100, a gun barrel 101, a pulse forming network (PFN) 102, cable conduit 103, a recoil mechanism 104, a gun mount 105 a rotating deck 106, gun armor 107, a fixed main deck of a ship 108, cables 110, a bulkhead 112, and an service port 114.

As shown, the turret 100 is coupled though its rotating deck 106, and enclosed partially by the gun armor 107 is the gun barrel 101 that is supported by the gun mount 105. The PFN 102 is within the bulkhead 112 and is located below the main deck 108, and pulsed power from the PFN 102 is fed to the gun barrel 101 via the cables 110 though cable conduit 103 on each side of the gun barrel 101. The recoil mechanism 104 for the gun is located below the gun barrel 101 leaving the sides of the gun barrel 101 open for electrical connections. In some embodiments, the gun barrel 101 is 10 meters in length, however, this is certainly not required.

As shown in FIG. 1, in several embodiments, the PFN 102 comprises a bank of capacitors that together form a cylindrical shaped PFN that is rotatable about an axis that is substantially normal to the rotating deck 106. The PFN 102 is preferably a 200 MJ capacitor based pulse forming network that is mounted to a rotatable surface directly below the electromagnetic gun. Advantageously, the rotating aspect of the PFN 102 allows the PFN 102 to be tightly enclosed within the bulkhead 112, and thus, occupy a minimum amount of space. Although the PFN 102 in several embodiments is designed to fit within the bulkhead 112 with only a small gap between an outside portion of the PFN 102 and an inside wall of the bulkhead 112, access to various parts of the PFN 102 is obtainable by rotating the entire PFN 102 until a portion needing attention is aligned with the service port 114.

In some embodiments, the PFN 102 and the turret 100 are rotated in unison so that the cables 110, which are unbroken, i.e., without substantial change in resistance or discontinuities, may be used to couple energy from the PFN 102 to the gun barrel 101 instead of slip rings or other electromechanical coupling devices (that introduce increased resistance) between the PFN 102 and the gun barrel 101. Beneficially, the reduced resistance provided by the cables 110 allows the amount of energy stored in the PFN 102, and hence, the overall volume of the PFN 102 to be substantially less than would otherwise be required if slip rings or other electromechanical coupling devises were used because energy losses in electrical connections between the PFN 102 and the gun barrel 101 are proportional to the product of resistance (which is greater with slip rings) and the square of the electrical current traveling through the connections.

Another beneficial aspect of several embodiments the present invention is a reduction in deleterious effects of gun recoil on the electrical connections, e.g., the cables 110, between the PFN 102 and the gun barrel 101. Specifically, in some embodiments, as described further with reference to FIG. 7, the electrical connections that are accelerated with the recoil are encased in a fluid of approximately the same density as the electrical connections, e.g., the cables 110 so that forces imparted on the electrical connections are coupled to the shell of the casing. In other embodiments, as discussed with reference to FIG. 10, the cables 110 are connected to a slip-rail connection so that the cables 110 remain stable when the barrel moves due to recoil.

Although the EM gun shown in FIG. 1 is a rail gun, it is important to note that the present invention is not-limited to rail guns and may include coil guns and Electrothermo Chemical (ETC) guns. While ETC guns are often categorized as something other than EM guns, ETC guns require a substantial discharge of energy to bring the chemical propellant up to temperature, and thus, for purposes of this disclosure, fall under the rubric of EM guns and are well within the scope of the present invention.

It is also important to note that while the PFN 102 is preferably an electrostatic capacitor based pulse forming network, the PFN 102 in other embodiments, may potentially be an electrolytic based capacitor system, a chemical-double-layer capacitor based system, a battery based system and/or a compulsator based system.

Figure 2:
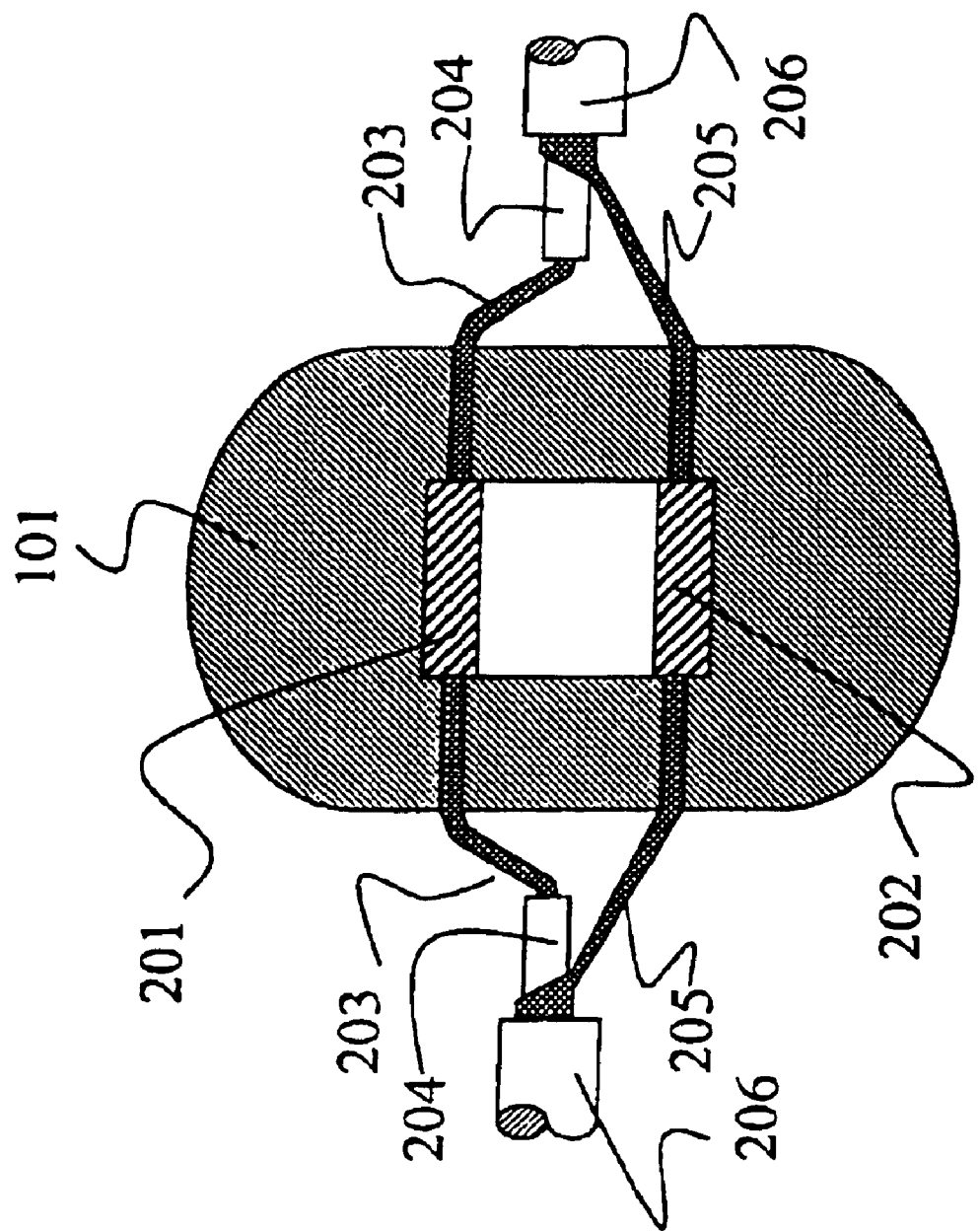
FIG. 2 is a is a cross sectional view of one embodiment of the gun barrel shown in FIG. 1.

Referring next to FIG. 2, shown is a cross sectional view of one embodiment of the gun barrel 101 of FIG. 1 illustrating electrical connections to top and lower rails of the gun barrel 101. Shown are top and lower rails 201, 202 of the gun barrel 101 that are electrically connected to two coaxial cables 206 on each side of the barrel. Also shown are center cable conductors 203 that electrically couple the top rail 201 to center conductors of the two coaxial cables 206, and outside cable conductors 205 that electrically couple the lower rail 202 to outer conductors of the two coaxial cables 206. Although two electrical connections are shown in the cross section view of the gun barrel 101 of FIG. 2, it should be recognized that in several embodiments, many connections, e.g., along the length of the gun barrel 101, are required to manage current required for a large rail gun. Smaller guns, however, may be able to operate with one electrical connection to each rail.

Referring next to FIGS. 3*a* and 3*b*, shown are a plan and side view respectively of one capacitor module 300 of the PFN 102 of FIG. 1 in accordance with one embodiment of the present invention. As discussed further herein, the PFN 102 in several embodiments is comprised of several capacitor modules 300.

As shown in FIG. 3*b*, the capacitor module 300 in the present embodiment is made up of three capacitors 301 and one coupling module 302. The coupling module 302, in several embodiments, provides switch, fuse and inductor functionality and couples the capacitors 301 with a PFN buss. In some embodiments the capacitors 301 are connected to the coupling module 302 via bayonet type bushings 303.

In several embodiments, the capacitor modules 300, the capacitors 301 and the coupling modules 302 are wedge-shaped. In one embodiment, as shown in FIG. 3*a*, the capacitors 301 include an outer edge 308 that is thicker than an inner edge 310 and side portions 312 that taper from the outer edge 308 to the inner edge 310 so that a distance between the side portions 312 decreases from the outer edge 308 in the direction of the inner edge 310. Similarly, coupling modules 302 have an outer edge 314 and an inner edge 316 and side portions 318 that taper from the outer edge 314 to the inner edge 316; thus a distance between side portions 318 of the coupling modules 302 decreases from the outer edge 314 in the direction of the inner edge 316.

Beneficially, the wedge shape of the capacitors 301 and utilization of the bayonet type bushings 303 allows the capacitors 301 to be easily removed in a radial direction from the PFN 102. Once the three capacitors 301 have been removed, the coupling module 302 can also be removed in the radial direction. In some embodiments, the entire capacitor module 300 will be removed as a unit. The coupling module 302 in some embodiments is also designed to be connected to a PFN buss by bayonet type bushings 304.

Also shown on both the capacitors 301 and the coupling module 302 are centering pins 306 that extend outwardly from the capacitor module 300 and are positioned to align with holes in the space frame as discussed further with reference to FIGS. 4a and 4b.

Referring next to FIGS. 4a and 4b, shown are plan and side views respectively of a space frame 400 for supporting the capacitor modules 300 of FIG. 3. As shown in FIG. 4a, the space frame 400 has horizontal members 402 that are configured to accommodate the wedge shaped capacitor modules 300. The centering pins 306 are designed to fit securely into holes in the vertical members 406 of the space fame 400. Additionally, as shown in FIG. 4b, latches 404 are coupled to vertical members 406 of the space frame 400 and are positioned to couple with centering pin mounts 306 of the capacitor module 300. Further, vertical member 407 has tapped holes to accept bolts 408 that, along with the centering pins 306 and latches 404 will hold the capacitor module 300 firmly in place.

Figure 5B:
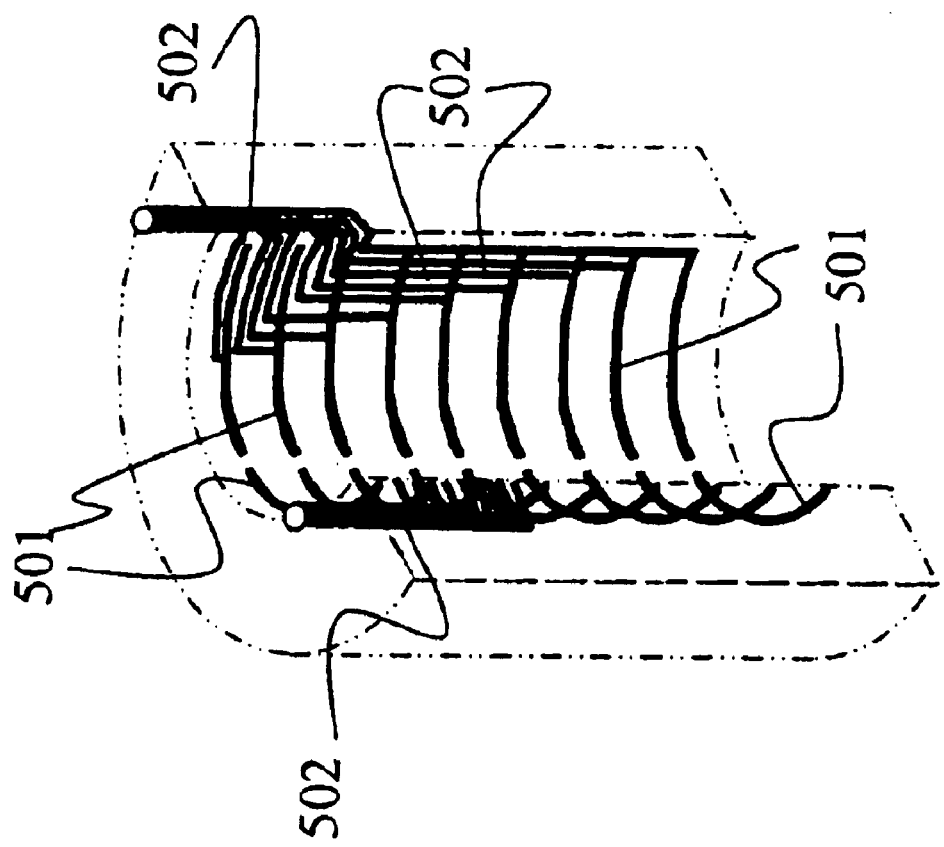
FIGS. 5a and 5b are perspective views of one half of the capacitor based PFN shown in FIG. 1 in accordance with one embodiment of the present invention.
Figure 5A:
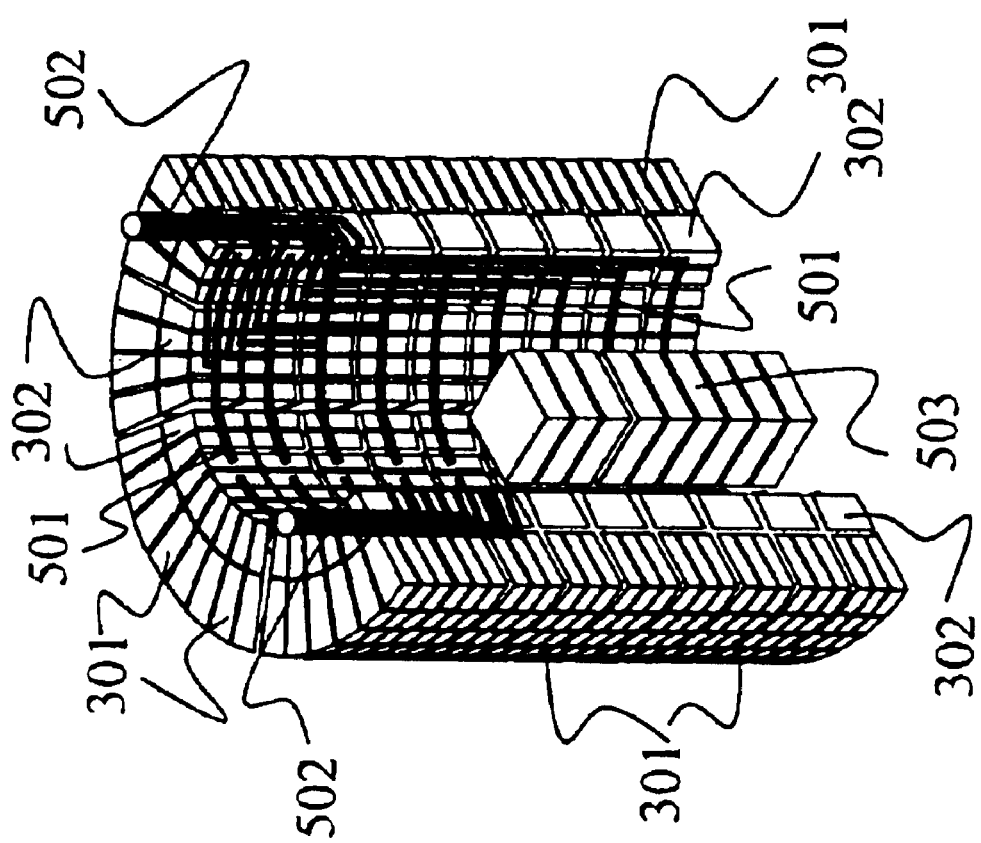

Referring next to FIGS. 5a and 5b, shown is one half of the capacitor based PFN 102 of FIG. 1 in accordance with one embodiment of the present invention. As shown in FIG. 5a, the capacitor modules 300, that include capacitors 301 and the coupling module 302, are stacked on top of each other and are arranged side to side at substantially the same distance from an axis inside the PFN 102.

In several embodiments, and as shown in FIGS. 5a and 5b; the coupling modules 302 are connected in groups with interconnecting PFN busses 501. In the half of the PFN 102 shown in the present embodiment, there are a total of 18 independent PFN busses 501. The electrical connection from the PFN busses 501 going toward the gun barrel 101 on the deck above is made with coaxial cables 502, and there is one coaxial cable 502 per PFN buss 501. For purposes of clarity, FIG. 5b shows high current connections in the PFN 102, that includes the buss work 501 and the coaxial cables 502, and other parts of the PFN 102 have been removed or are shown as area lines.

Also shown in FIG. 5a are capacitor charging power supplies 503 for the half of the PFN 102 shown. In this configuration, there is one power supply 503 for each layer of switch, fuse and inductor modules in the shown half of the PFN 102. A single power supply 503 is connected to all capacitors that are electrically connected to two of the busses 501 where the two busses are on the same level and in the same half of the bank. Connections from the ship's power to the capacitor charging power supplies 503 and from the power supplies 503 to the capacitors 301 that are being charged is not shown. These connections are relatively low in current compared to the high current connections detailed in FIG. 5b.

Referring next to FIG. 6a and 6b, a service port 114 and a rotating aspect of the PFN 102 are shown according to one embodiment of the present invention. As shown in FIG. 6a, the service port 114 is an opening in the PFN bulkhead 112 that allows access to the PFN 102. In FIG. 6a, the PFN 102 is positioned so that a division of the two haves of the PFN 102, is located at the service port 114. With the PFN 102 in this position, an interior portion of the PFN 102 is accessible through the division between the two halves.

In FIG. 6b, the PFN 102 and gun barrel 101 are rotated 90° from their respective positions in FIG. 6a, and a column of capacitors in the PFN 102 is accessible for removal via the service port 114 in the bulkhead 112. The coupling module 302 is designed to be removed with or after the capacitors associated with the module have been removed through the service port 114. Advantageously, by rotating the PFN 102, any part of the PFN 102 can be accessed, and thus, the amount of space required on a naval vessel by the bulkhead 112 is minimized because extra space between the PFN 102 and the bulkhead 112 need not be set aside to accommodate removal of capacitors 301 and/or coupling module 302 and/or the capacitor module 300.

Preferably, the PFN 102 and bulkhead 501 comprise substantially circular forms, i.e., a cross section of the PFN normal to its axis of rotation is substantially circular; however, other configurations may be employed. Specifically, the PFN may take on other substantially circular forms, i.e., forms that permit the PFN 102 to rotate within the bulkhead 501. For example, the PFN 102 may have a conical shape, or may be elliptical, but may still rotate within the bulkhead 501. Similarly, the bulkhead 501 need not be perfectly circular and still allow the PFN 102 to rotate freely within.

Large guns normally have a significant movement due to recoil. When a projectile moves forward through a gun barrel, the gun barrel moves backward. The difference in velocity between the projectile and the barrel is inversely proportioned to mass ratio of the projectile and barrel. An unrestricted barrel, for example, with a mass of 20,000 kg firing a 20 kg projectile at 3.5 km/s would have a velocity of approximately 111 m/s in the opposite direction of the projectile. The movement of the barrels is normally restricted by a recoil mechanism 104. This movement creates problems for interconnections between the PFN 102 and the barrel 101.

Figures 7A, 7B:
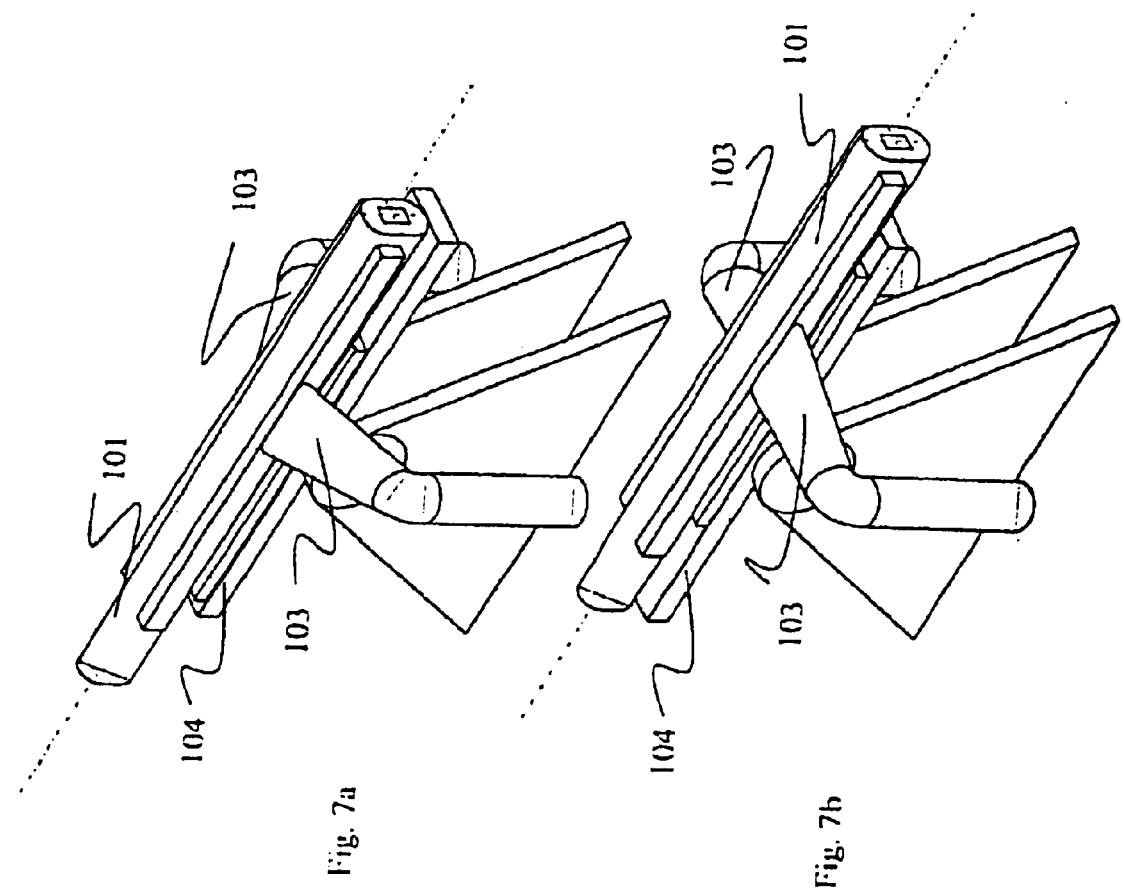
FIGS. 7a and 7b are perspective views of the gun barrel of FIG. 1 in a ready position and a recoil position respectively.
Figure 8B:
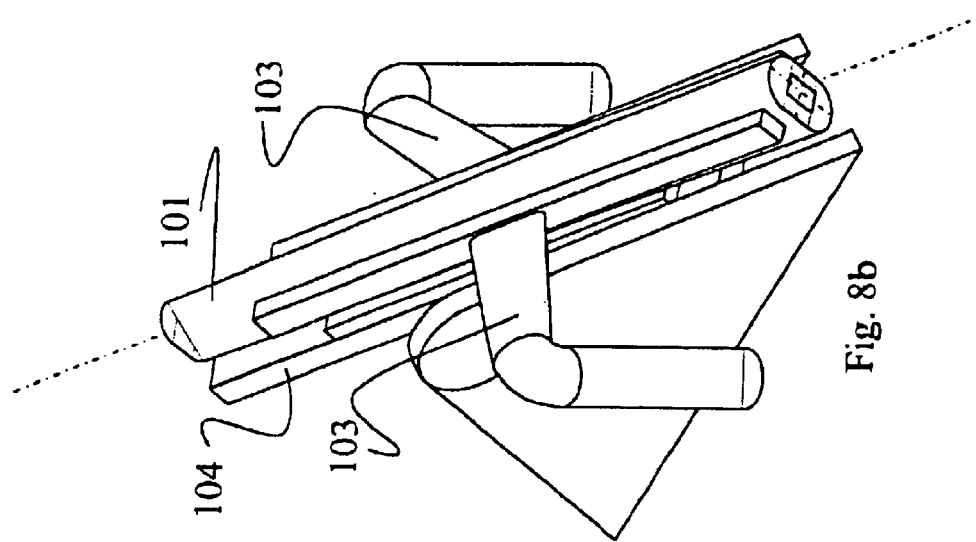
FIGS. 8*a* and 8*b* are additional perspective views of the gun barrel of FIG. 1 in a ready and a recoil position respectively.
Figure 8A:
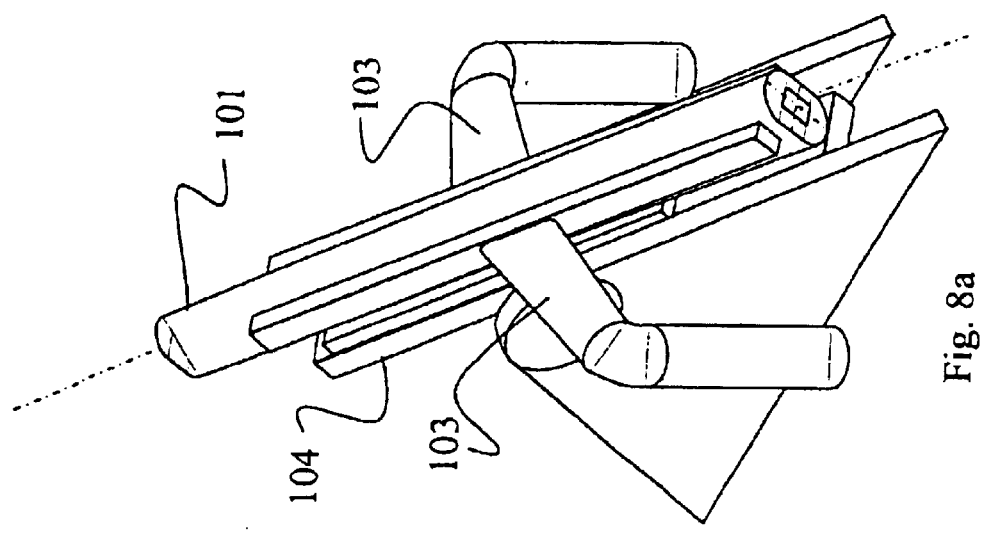

Referring to FIGS. 7 and 8, the barrel 100 is shown in both ready and recoiled positions. Specifically, FIGS. 7a and 8a show the barrel 101 in the ready position, and FIGS. 7b and 8b show the barrel 101 in the recoiled position. The flexible cable conduit 103 is designed to allow the cable harness 502 to flex allowing the cables 206 to move relative to each other when the barrel is moved from one position to another as is shown in FIGS. 7 and 8.

To prevent stress from building up in the cables during gun recoil, in some embodiments, the upper part of the conduit 103 that must move when the barrel recoils is filled with a fluid that surrounds the cables 206 in the harnesses 502. A wide variety of fluids could be used for this purpose including water or transformer oil, each having certain advantages. This fluid is about the same density as the cables, and when the gun recoils, the cables 206, floating in the fluid filled conduits 103, accelerate with the fluid; thus reducing the stress in the cable by pressurizing the fluid and transmitting the force to a shell of the conduit 103.

Figure 9:
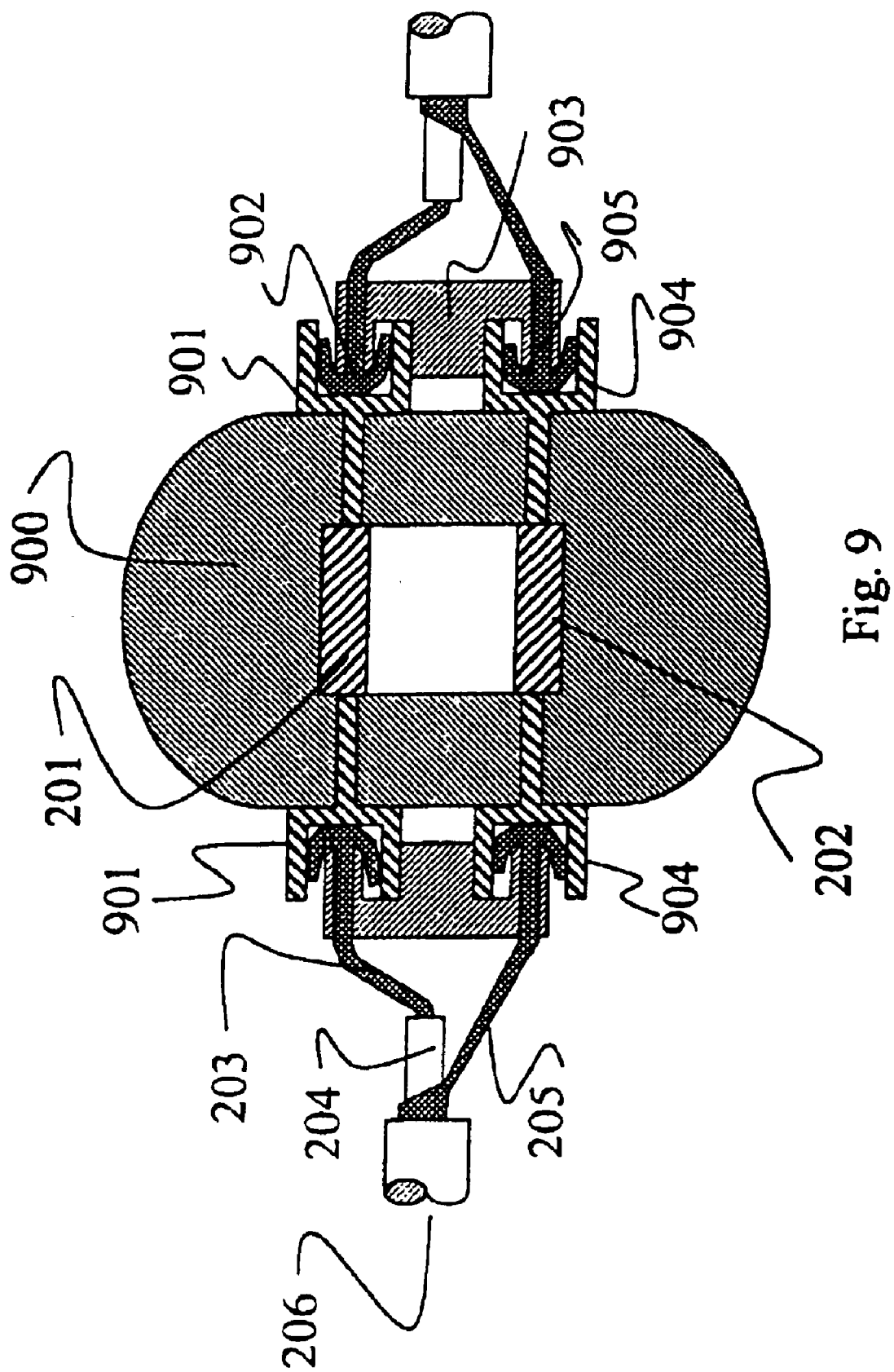
FIG. 9 is a cross sectional view of an alternative gun barrel with slip rails.

In another embodiment, the connection between the cables 206 and the barrel 101 can be made with sliding contacts as is shown in FIGS. 9 and 10, where the cables 206 are not accelerated during recoil.

Referring to FIG. 9, shown is cross sectional view of a barrel 900 with slip rails that allow the barrel 900 to recoil without moving the cables 206. Shown are two upper slip rails 901 positioned on each side of the barrel 900 and two lower slip rails 904 that are also positioned on each side of the barrel 900 below upper the slip rails 901. The upper and lower slip rails 901, 904 couple with the top and lower rails 201, 202 respectively and provide a grooved coupling for the connections 902, 905 that couple with the center connector 203 and the outside connector 205 of the cables 206 respectively. The connections 902, 905 fit in the grooved portions of the upper and lower slip rails 901, 904 so as to slide along the slip rails 901, 904 while maintaining contact with the slip rails and are shown mounted to a static contact support 903.

As shown in FIGS. 10*a* and 10*b*, which show perspective views of the barrel 900 in a ready and a recoil position respectively, the static contact support 903 is designed to move with the gun mount 105 rather than with the barrel 101 when the gun recoils. Thus, as shown in FIG. 10*b*, the cable conduit 103, and hence the cables 206 and cable harness 502, remain relatively static as the barrel 900 recoils—minimizing the stress on these parts of the system.

While the invention herein disclosed has been described by means of specific embodiments and applications thereof, numerous modifications and variations could be made thereto by those skilled in the art without departing from the scope of the invention set forth in the claims.

What is claimed is:

1. An electromagnetic gun system comprising:
   a gun barrel;
   a gun mount coupled to the gun barrel to mount the gun barrel upon a rotating platform which, rotates about a vertical axis; and
   a pulse forming network electrically coupled to the gun barrel and located vertically below said platform;
   wherein the pulse forming network is supported to rotate about said same vertical axis.

2. The electromagnetic gun of claim 1 wherein the pulse forming network comprises a substantially circular shape so as to rotate within a substantially circular bulkhead.

3. The electromagnetic gun of claim 2 wherein the pulse forming network comprises two halves, and wherein the two halves are separated by a gap that permits access to an interior portion of the pulse forming network.

4. The electromagnetic gun of claim 1 wherein the pulse forming network comprises a plurality of capacitor modules disposed a substantially equal radial distance about the axis.

5. The electromagnetic gun of claim 4 wherein the capacitor modules comprise a wedge shape.

6. The electromagnetic gun of claim 5 wherein the capacitor modules are removable in a radial direction with respect to the axis.

7. The electromagnetic gun of claim 1 wherein the gun barrel and the pulse forming network are configured to rotate in unison.

8. The electromagnetic gun of claim 7 wherein the gun barrel is coupled to the pulse forming network with an unbroken cable coupling.

9. The electromagnetic gun of claim 8 further comprising a flexible cable conduit coupled to the gun barrel for housing the cable coupling, wherein the flexible cable conduit is filled with a fluid to surround the cable coupling, and wherein the fluid has approximately the same density as the cable coupling.

10. The electromagnetic gun of claim 1 wherein the gun barrel comprises slip rails, wherein energy is coupled to the gun barrel from the pulse forming network to the gun barrel via the slip rails, and wherein fixed connections from the pulse forming network to the slip rails remain in contact with the slip rails as the gun barrel moves.

11. A method for operating an electromagnetic gun, which method comprises:
    supporting an electromagnetic gun upon a rotatable platform;
    providing a pulse forming network having a substantially circular cross sectional shape;
    locating the pulse forming network within an enclosure located vertically below the rotatable platform and supporting same to rotate on the same axis as the platform;
    electrically coupling the electromagnetic gun on the rotatable platform to the pulse forming network;
    providing energy to charge the pulse forming network; and
    causing pulsed energy from the pulse forming network to flow to the electromagnetic gun to operate the gun.

12. The method of claim 11 wherein the pulse forming network and the electromagnetic gun are rotated in unison to aim the gun.

13. The method of claim 11 wherein the pulsed energy from the pulse forming network flows to the electromagnetic gun via unbroken cabling.

14. An electromagnetic gun system which comprises:
    a gun barrel for discharging a projectile;
    a rotatable support platform which rotates about a vertical axis;
    a gun mount for supporting the gun barrel upon the rotatable platform; and
    a pulse forming network electrically coupled to the gun barrel;
    the pulse forming network being located vertically below said platform and supported so as to rotate about the same vertical axis as said platform.

15. The electromagnetic gun of claim 14 wherein the pulse forming network has a substantially circular cross-sectional shape and is disposed within a substantially circular stationary bulkhead within which it rotates.

16. The electromagnetic gun of claim 15 wherein the pulse forming network comprises two semi-annular halves, and wherein the two halves are separated by a gap that permits access to an interior portion of the pulse forming network.

17. The electromagnetic gun of claim 16 wherein the pulse forming network comprises a plurality of wedge-shaped, radially removable capacitor modules, each disposed a substantially equal radial distance about the axis of rotation and wherein said bulkhead includes a service port through which said modules can be serviced or removed.

18. The electromagnetic gun of claim 15 wherein the gun mount and the pulse forming network are interconnected so as to rotate in unison.

19. The electromagnetic gun of claim 15 wherein the gun barrel is coupled to the pulse forming network with an unbroken flexible cable arrangement which contains a plurality of cables housed in a flexible cable conduit that is filled with a fluid which surrounds the cables, which fluid has a density close to that of the cables.

20. The electromagnetic gun of claim 14 wherein the gun barrel includes pairs of slip rails through which the energy from the pulse forming network flows and wherein electrical connectors from the pulse forming network, that are fixedly connected to the gun mount, remain in sliding contact with the slip rails as the gun barrel moves in recoil.

* * * * *